W. J. CROTHERS.
CAMERA.
APPLICATION FILED NOV. 15, 1915.
1,272,227.
Patented July 9, 1918.
2 SHEETS—SHEET 2.
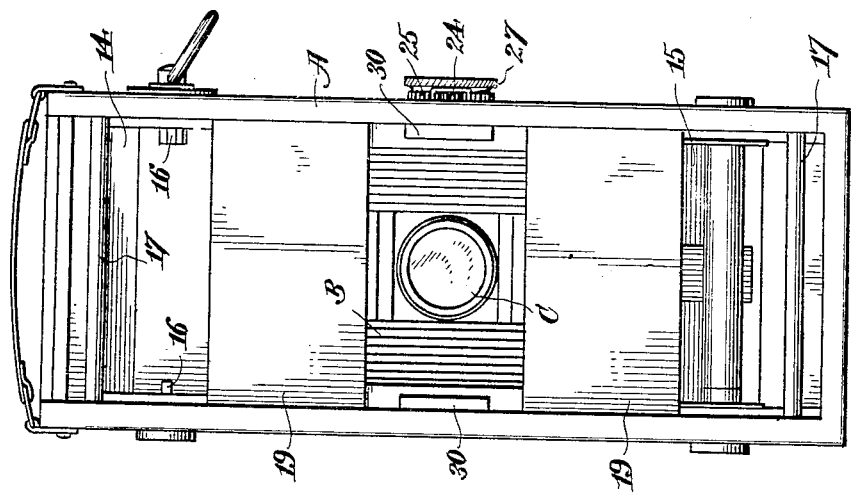
Inventor,
William J. Crothers.
Witnesses:
By Victor J. Evans,
Attorney.

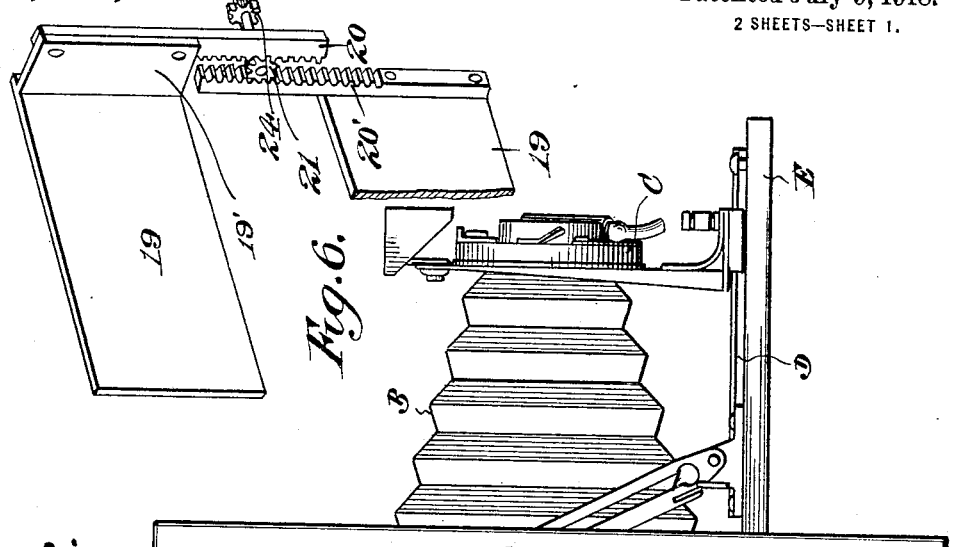
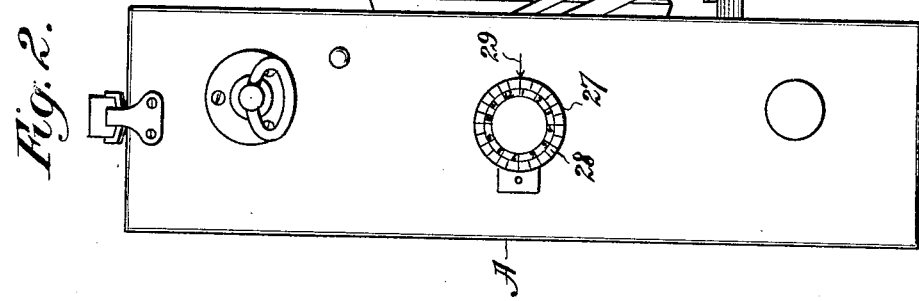
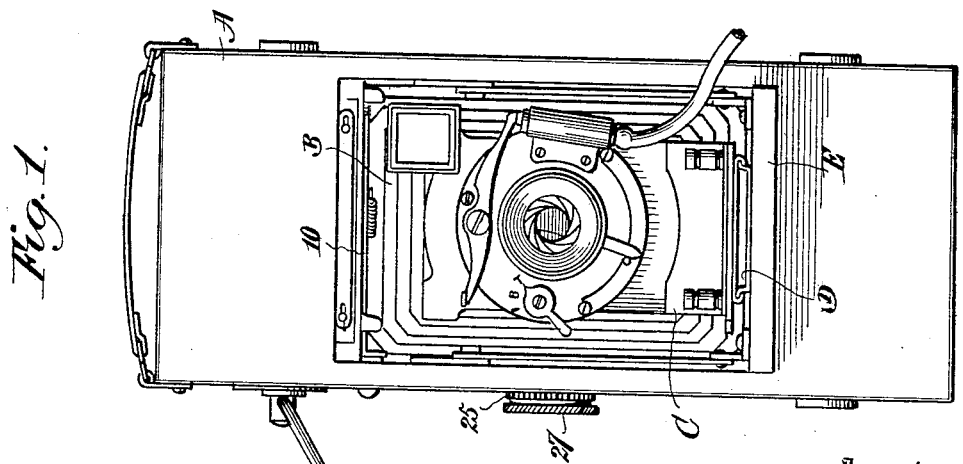

UNITED STATES PATENT OFFICE.

WILLIAM JOHN CROTHERS, OF TORONTO, ONTARIO, CANADA.

CAMERA.

1,272,227.  Specification of Letters Patent.  Patented July 9, 1918.

Application filed November 15, 1915.  Serial No. 61,644.

*To all whom it may concern:*

Be it known that I, WILLIAM J. CROTHERS, a subject of the King of Great Britain, residing at Toronto, in the Province of Ontario and Dominion of Canada, have invented new and useful Improvements in Cameras, of which the following is a specification.

The invention relates to cameras, and more particularly to the class of folding cameras.

The primary object of the invention is the provision of a camera of this character wherein different sizes of pictures can be taken with the use of a single film strip, thereby enabling only such objects to appear in the picture as intended.

Another object of the invention is the provision of a camera of this character wherein the construction thereof is novel in form to permit the automatic adjustment for varying the size of the picture with despatch and accuracy.

A further object of the invention is the provision of a camera of this character wherein the user can determine with accuracy the exact size of the picture when produced from the film strip on the taking of the picture, and the picture can be conveniently varied in size to suit the fancy of the user of the camera.

A still further object of the invention is the provision of a camera of this character which is simple in construction, thoroughly reliable and efficient in its operation, and inexpensive in manufacture.

Other objects will be in part obvious and in part hereinafter pointed out.

The invention accordingly resides in the features of construction, combination of elements and arrangement of parts which will be exemplified in the construction hereinafter set forth and the scope of the application of which will be indicated in the claims hereunto appended.

In the accompanying drawings:

Figure 1 is a front elevation of a camera constructed in accordance with the invention ready for use;

Fig. 2 is a side elevation thereof;

Fig. 3 is a rear elevation with the back removed, and showing the body partly broken away;

Fig. 4 is a fragmentary vertical longitudinal sectional view;

Fig. 5 is a fragmentary vertical transverse sectional view, and Fig. 6 is a perspective view showing the means for operating the shutters 19.

Similar reference characters indicate corresponding parts throughout the several views in the drawings.

Referring to the drawings in detail, A designates the box-like body which is of elongated rectangular shape, preferably made from wood, although the same may be of any other desirable shape and made from any suitable material, B the bellows, C the lens carriage and D the slide track of the camera, these parts being of the ordinary well known construction. The body A is formed with the usual swinging front section E which is suitably hinged and supports a portion of the track D for the lens carriage, as usual, to permit the expansion and contraction of the bellows B in the focusing of the camera.

The front section E, when closed, is held through the medium of the hand release latch 10 which is operated through the medium of a terminal button 10' located in a suitable countersink in one side wall of the body A in the exterior face thereof, and this latch is suitably mounted in said body A of the camera and may be of any preferred type and is acted upon by the spring 10ᵃ to hold the same in position for locking engagement with the keepers F on the front section E, it being understood, of course, that the said front section can be locked in any suitable manner. The latch 10 is preferably in the form of a plate 6, slidably mounted on headed pins 6' secured to the camera box, said plate being provided with lips 7, to engage in rear of the heads of the studs F for the locking operation. A spring 7' is connected to the camera box and to the plate to normally hold the lips 7 in locking position. In the rear of the body A is a removable back section 11 which is slidably fitted in a suitable guide groove 11' formed in the inner faces of the side walls and the bottom of the body of the camera. The body A has at its top a hinged top section 12, the latter, together with the back section 11, permitting the convenient placing of the film spools and the removal thereof in and from the camera body A. The body A is formed above and below the bellows B with spool receiving chambers 14 in which are removably fitted the spools 15 which are rotatably journaled therein upon the members 16 which permit the convenient detaching of the spools for the removal of the same from the camera or the convenient placing of the same therein. It is of course understood that the spools can be detachably and rotatably mounted within the body in any suitable manner.

The film, which is normally wound upon one of the spools 15, is adapted to be trained over the guide rollers 17 which are journaled in the sides of the body A of the camera near the ends thereof so as to guide the said film when placed within the camera.

Formed in the inner faces of the sides of the body A of the camera and extending longitudinally from the bottom to the top thereof are guideways 18 in which are slidably engaged both of the end edges of plates forming shutters 19, while formed on one of the shutters, near one end edge, is a right angular wing or flange 19' to which are riveted or otherwise secured the rack bars 20, while suitably fixed directly to the other shutter, that is to say, the lowermost shutter, spaced from one end edge, is a rack bar 20', and these bars 20 and 20' mesh with a rack pinion 21 journaled in a bracket 22 fixed to one side of the body A. The pinion stud shaft 23 carries a small gear 24 which meshes with a larger gear 25 on a stud shaft 26 which is projected without the body A and has mounted on its outer end a peripherally knurled hand wheel or disk 27, on the outer face of which is formed a dial 28 having indicia thereon adapted to coöperate with a pointer or indicator mark 29 on the outer face of one side wall of the body A so that by the coöperation of the indicia and the mark or pointer the user of the camera can readily determine the positions of the shutters 19 relative to each other within the body of the camera and thus accurately set said shutters according to the desired size of picture intended.

On operating the disk or wheel 27 the shutters are moved by the sliding thereof within the guideways 18 toward or away from each other, thereby varying the size of the light space so as to vary the size of the picture upon the film which is adjusted in the usual well known manner within the body of the camera. Arranged within the body A of the camera in the path of movement of the shutters are blocks forming stops 30 which are fixed in any suitable manner to the body thereof and prevent the shutters coming together or meeting when adjusted toward each other. It is of course understood that suitable guides, as at 31, which are stationarily mounted within the body, are provided for the rack bars 20 and 20' to prevent dislodgment thereof or slipping out of place when the shutters are operated.

From the foregoing description, taken in connection with the accompanying drawings, the construction and operation of the camera will be apparent and a more extended explanation has, therefore, been omitted.

Having thus described my invention, I claim:

1. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, and an indicator supported by the body exteriorly thereof and coöperating with the first named means for adjusting the shutters.

2. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, an indicator supported by the body exteriorly thereof and coöperating with the first named means for adjusting the shutters, and means for guiding a film strip contiguous to the shutters rearwardly thereof.

3. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, an indicator supported by the body exteriorly thereof and coöperating with the first-named means for adjusting the shutters, means for guiding a film strip contiguous to the shutters rearwardly thereof, and a back slide fitted in the body and removable therefrom.

4. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, an indicator supported by the body exteriorly thereof and coöperating with the first-named means for adjusting the shutters, means for guiding a film strip contiguous to the shutters rearwardly thereof, a back slide fitted in the body and removable therefrom, and a hinged top on said body.

5. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, an indicator supported by the body exteriorly thereof and coöperating with the first-named means for adjusting the shutters, means for guiding a film strip contiguous to the shutters rearwardly thereof, a back slide fitted in the body and removable therefrom, a hinged top on said body, and a swinging front section carried by the body and supporting the lens carriage.

6. In a camera, an elongated body having an extensible bellows foldable therein, a lens carriage supporting the front end of the bellows, shutters arranged within the body rearwardly of the bellows and adapted to vary the light space when an exposure is made through a lens, means for adjusting the shutters simultaneously with each other, means for limiting the movement of the shutters toward each other, an indicator supported by the body exteriorly thereof and coöperating with the first-named means for adjusting the shutters, means for guiding a film strip contiguous to the shutters rearwardly thereof, a back slide fitted in the body and removable therefrom, a hinged top on said body, a swinging front section carried by the body and supporting the lens carriage, and a track on said swinging section for the carriage.

In testimony whereof I affix my signature in presence of two witnesses.

WILLIAM JOHN CROTHERS.

Witnesses:
D. S. TOVELL,
JOSEPH CHURCHILL.

Copies of this patent may be obtained for five cents each, by addressing the "Commissioner of Patents, Washington, D. C."